(12) United States Patent
Jiang et al.

(10) Patent No.: US 11,659,550 B2
(45) Date of Patent: May 23, 2023

(54) CONFIGURATION RESOURCE SENDING, CONFIGURING AND RECEIVING METHODS AND APPARATUSES

(71) Applicant: ZTE CORPORATION, Shenzhen (CN)

(72) Inventors: Chuangxin Jiang, Shenzhen (CN); YuNgok Li, Shenzhen (CN); Yijian Chen, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 530 days.

(21) Appl. No.: 16/625,941

(22) PCT Filed: Jul. 27, 2018

(86) PCT No.: PCT/CN2018/097446
§ 371 (c)(1),
(2) Date: Dec. 23, 2019

(87) PCT Pub. No.: WO2018/233722
PCT Pub. Date: Dec. 27, 2018

(65) Prior Publication Data
US 2020/0163078 A1  May 21, 2020

(30) Foreign Application Priority Data
Jun. 23, 2017  (CN) .......................... 201710488199.0

(51) Int. Cl.
*H04W 72/04* (2023.01)
*H04L 5/00* (2006.01)
*H04L 27/26* (2006.01)

(52) U.S. Cl.
CPC ....... *H04W 72/0406* (2013.01); *H04L 5/0048* (2013.01); *H04L 27/261* (2013.01);
(Continued)

(58) Field of Classification Search
None
See application file for complete search history.

(56) References Cited

U.S. PATENT DOCUMENTS 10,461,908 B2 * 10/2019 Patel ................. H04W 72/1294
11,259,248 B2 * 2/2022 Akkarakaran ...... H04W 52/346
(Continued)

FOREIGN PATENT DOCUMENTS

| CN | 101626620 A | 1/2010 |
|----|-------------|--------|
| CN | 101682596 A | 3/2010 |

(Continued)

OTHER PUBLICATIONS

3GPP TSG RAN WG1 Meeting #88bis R1-1704413 Spokane, USA Apr. 3-7, 2017 Source: ZTE, ZTE Microelectronics Title: Discussion on RS for phase tracking Agenda item: 8.1.2.4.3.
(Continued)

*Primary Examiner* — Hassan A Phillips
*Assistant Examiner* — Gautam Sharma
(74) *Attorney, Agent, or Firm* — George McGuire

(57) ABSTRACT

Provided are methods and apparatuses for sending, configuring and receiving a configuration resource. A signal sending method includes: where a sending mode of a signal sent by using the first configuration resource includes a mode of time-domain code division multiplexing, and a signal sent by using the second configuration resource includes a phase tracking reference signal; and sending signals by using the first configuration resource and the second configuration resource, where a resource intersection of the first configuration resource and the second configuration resource in time domain is an empty set.

5 Claims, 5 Drawing Sheets

---

Receive an association relationship, configured by a sending end, between a predetermined relationship and information about a configuration resource, where the predetermined relationship includes a relationship between a demodulation reference signal and data corresponding to the demodulation reference signal; the predetermined relationship includes at least one of: whether a multiplexing mode of the demodulation reference signal and the corresponding data includes frequency division multiplexing (FDM), or a power parameter ratio of the demodulation reference signal to the corresponding data; the information about the configuration resource includes at least one of: the number of time-domain symbols included in a receiving unit of a receiving end, the number of time-domain symbols of the demodulation reference signal included in the receiving unit of the receiving end, the number of time-domain symbols included in a scheduled resource in the receiving unit of the receiving end, or a time-domain spacing of the demodulation reference signal included in the receiving unit of the receiving end ⟶ S502

(52) U.S. Cl.
CPC ..... *H04L 27/2602* (2013.01); *H04W 72/0413* (2013.01); *H04L 27/26035* (2021.01)

(56) References Cited

U.S. PATENT DOCUMENTS

| | | | |
|---|---|---|---|
| 2012/0275415 A1* | 11/2012 | Wang | H04L 1/0061 370/329 |
| 2012/0314667 A1* | 12/2012 | Taoka | H04B 7/0452 370/329 |
| 2019/0327058 A1 | 10/2019 | Jiang et al. | |
| 2019/0342867 A1* | 11/2019 | Lin | H04W 72/0446 |
| 2020/0107300 A1* | 4/2020 | Kwak | H04L 5/0094 |
| 2020/0163078 A1* | 5/2020 | Jiang | H04L 5/0028 |

FOREIGN PATENT DOCUMENTS

| | | |
|---|---|---|
| CN | 106685620 A | 5/2017 |
| CN | 108112079 A | 6/2018 |
| WO | 2013117231 A1 | 8/2013 |

OTHER PUBLICATIONS

3GPP TSG RAN WG1 Meeting #89 R1-1707132 Hangzhou, CHN May 14-19, 2017 Source: ZTE Title: Discussion on RS for phase tracking Agenda item: 7.1.2.4.3.

International Search Report and Written Opinion Form PCT/ISA/210 and PCT/ISA237, International Application No. PCT/CN2018/097446, pp. 1-8, International Filing Date Jul. 27, 2018, dated Nov. 1, 2018.

\* cited by examiner

Establish an association relationship between a predetermined relationship and information about a configuration resource, where the predetermined relationship includes a relationship between a demodulation reference signal and data corresponding to the demodulation reference signal; the predetermined relationship includes at least one of: whether a multiplexing mode of the demodulation reference signal and the corresponding data includes frequency division multiplexing, or a power parameter ratio of the demodulation reference signal to the corresponding data; the information about the configuration resource includes at least one of: the number of time-domain symbols included in a sending unit, the number of time-domain symbols of the demodulation reference signal included in the sending unit, the number of time-domain symbols included in a scheduled resource allocated to a receiving end in the sending unit, or a time-domain spacing of the demodulation reference signal included in the sending unit; and the information about the configuration resource is various types of information for indicating or describing the configuration resource ⟋ S402

FIG. 4

Receive an association relationship, configured by a sending end, between a predetermined relationship and information about a configuration resource, where the predetermined relationship includes a relationship between a demodulation reference signal and data corresponding to the demodulation reference signal; the predetermined relationship includes at least one of: whether a multiplexing mode of the demodulation reference signal and the corresponding data includes frequency division multiplexing (FDM), or a power parameter ratio of the demodulation reference signal to the corresponding data; the information about the configuration resource includes at least one of: the number of time-domain symbols included in a receiving unit of a receiving end, the number of time-domain symbols of the demodulation reference signal included in the receiving unit of the receiving end, the number of time-domain symbols included in a scheduled resource in the receiving unit of the receiving end, or a time-domain spacing of the demodulation reference signal included in the receiving unit of the receiving end ⟋ S502

FIG. 5

▒ Demodulation reference signal

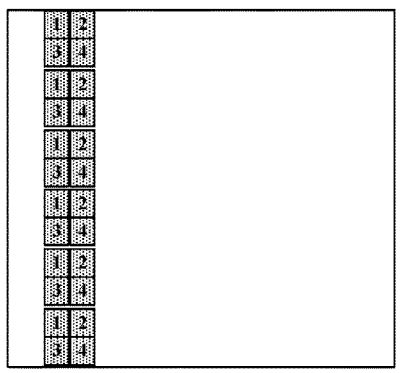

CONFIGURATION RESOURCE SENDING, CONFIGURING AND RECEIVING METHODS AND APPARATUSES

CROSS-REFERENCES TO RELATED APPLICATIONS

This is a National Stage Application, filed under 35 U.S.C. 371, of International Patent Application No. PCT/CN2018/097446, filed on Jul. 27, 2018, which claims priority to Chinese patent application No. 201710488199.0 filed on Jun. 23, 2017, contents of both of which are incorporated herein by reference in their entireties.

TECHNICAL FIELD

The present disclosure relates to, but is not limited to, the field of communications and, in particular, relates to methods and apparatuses for sending, configuring and receiving a configuration resource.

BACKGROUND

At present, the new radio (NR) physical layer technology is under discussion in the radio access network (RAN) of the 3rd generation partnership project (3GPP). However, flexibility and efficiency have always been goals of an NR physical layer design. The pursuit of maximum flexibility by a physical layer reference signal also seems to be a trend. This is because requirements for demodulation reference signals may be different in different application scenarios. At a low frequency, the influence of phase noises does not need to be considered during demodulation, and this is similar to a reference signal design in long-term evolution (LTE). However, at a high frequency, a phase tracking reference signal (PTRS) may need to be introduced for estimating the phase noises. This is because at the high frequency, the phase noises will greatly reduce the estimation accuracy of a demodulation reference signal in the time domain, thereby reducing system transmission efficiency.

As can be seen from the above, in a scenario of the high frequency and the phase noises, a simultaneous application of the phase tracking reference signal and time-domain code division multiplexing of another signal should be limited, otherwise the system transmission efficiency will be affected. If a base station has configured the phase tracking reference signal and the time-domain code division multiplexing of another signal, a user should change the understanding of this signaling.

The present disclosure aims at the problem of poor transmission reliability or a poor transmission quality and the like caused by simultaneous transmissions of in a time-domain code division multiplexing mode of another signal and the phase tracking reference signal.

SUMMARY

Embodiments of the present disclosure provide methods and apparatuses for sending, configuring and receiving a configuration resource.

According to an embodiment of the present disclosure, a signal sending method is provided. The method includes: determining a first configuration resource and a second configuration resource, where a sending mode of a signal sent by using the first configuration resource includes a sending mode of time-domain code division multiplexing, and a signal sent by using the second configuration resource includes a phase tracking reference signal; and sending signals by using the first configuration resource and the second configuration resource, where a resource intersection of the first configuration resource and the second configuration resource in time domain is an empty set.

According to another embodiment of the present disclosure, a signal receiving method is provided. The method includes: receiving a first configuration resource and a second configuration resource, where a receiving mode of a signal sent by using the first configuration resource includes a receiving mode of time-domain code division multiplexing, and a signal sent by using the second configuration resource includes a phase tracking reference signal; and receiving signals sent by using the first configuration resource and the second configuration resource, where a resource intersection of the first configuration resource and the second configuration resource in time domain is an empty set.

According to another embodiment of the present disclosure, a signal receiving method is provided. The method includes establishing an association relationship between a predetermined relationship and information about a configuration resource. The predetermined relationship includes a relationship between a demodulation reference signal and data corresponding to the demodulation reference signal.

The predetermined relationship includes at least one of: whether a multiplexing mode of the demodulation reference signal and the corresponding data includes frequency division multiplexing, or a power parameter ratio of the demodulation reference signal to the corresponding data.

The information about the configuration resource includes at least one of: a number of time-domain symbols included in a sending unit, a number of time-domain symbols of the demodulation reference signal included in the sending unit, a number of time-domain symbols included in a schedule resource allocated to a receiving end in the sending unit, or a time-domain spacing of the demodulation reference signal included in the sending unit.

According to another embodiment of the present disclosure, a signal sending apparatus is provided. The apparatus includes: a first determination module and a first sending module. The first determination module is configured to determine a first configuration resource and a second configuration resource, where a sending mode of a signal sent by using the first configuration resource includes a sending mode of time-domain code division multiplexing, and a signal sent by using the second configuration resource includes a phase tracking reference signal. The first sending module is configured to send signals by using the first configuration resource and the second configuration resource, where a resource intersection of the first configuration resource and the second configuration resource in time domain is an empty set.

According to another embodiment of the present disclosure, a signal receiving apparatus is provided. The apparatus includes: a first receiving module and a first configuration module. The first receiving module is configured to receive a first configuration resource and a second configuration resource, where a receiving mode of a signal sent by using the first configuration resource includes a receiving mode of time-domain code division multiplexing, and a signal sent by using the second configuration resource includes a phase tracking reference signal. The first configuration module is configured to receive signals sent by using the first configuration resource and the second configuration resource, where a resource intersection of the first configuration resource and the second configuration resource in time domain is an empty set.

According to another embodiment of the present disclosure, an apparatus for configuring a configuration resource is further provided. The apparatus includes a second configuration module.

The second configuration module is configured to configure an association relationship between a predetermined relationship and information about the configuration resource, where the predetermined relationship includes a relationship between a demodulation reference signal and data corresponding to the demodulation reference signal.

The predetermined relationship includes at least one of: whether a multiplexing mode of the demodulation reference signal and the corresponding data includes frequency division multiplexing, or a power parameter ratio of the demodulation reference signal to the corresponding data.

The information about the configuration resource includes at least one of: a number of time-domain symbols included in a sending unit, a number of time-domain symbols of the demodulation reference signal included in the sending unit, a number of time-domain symbols included in a schedule resource allocated to a receiving end in the sending unit, or a time-domain spacing of the demodulation reference signal included in the sending unit.

According to another embodiment of the present disclosure, an apparatus for configuring a configuration resource is further provided. The apparatus includes a second receiving module.

The second receiving module is configured to receive an association relationship, configured by a sending end, between a predetermined relationship and information about the configuration resource, where the predetermined relationship includes a relationship between a demodulation reference signal and data corresponding to the demodulation reference signal.

The predetermined relationship includes at least one of: whether a multiplexing mode of the demodulation reference signal and the corresponding data includes frequency division multiplexing, or a power parameter ratio of the demodulation reference signal to the corresponding data.

The information about the configuration resource includes at least one of: a number of time-domain symbols included in a receiving unit of a receiving end, a number of time-domain symbols of the demodulation reference signal included in the receiving unit of the receiving end, a number of time-domain symbols included in a scheduled resource in the receiving unit of the receiving end, or a time-domain spacing of the demodulation reference signal included in the receiving unit of the receiving end.

According to another embodiment of the present disclosure, a storage medium is further provided. The storage medium includes a stored program, where when executed, the program implements the method according to any one of the embodiments described above.

According to another embodiment of the present disclosure, a processor is further provided. The processor is configured to execute a program, where when executed, the program implements the method according to any one of the embodiments described above.

After the sending end determines the first configuration resource and the second configuration resource, where the sending mode of the signal sent by using the first configuration resource includes the sending mode of time-domain code division multiplexing and the signal sent by using the second configuration resource includes the phase tracking reference signal, the sending end sends the signals to the receiving end by using the first configuration resource and the second configuration resource, where the resource intersection in the time domain of the first configuration resource and the second configuration resource is the empty set, so that the sending end does not simultaneously send the signal sent by using the first configuration resource and the signal sent by using the second configuration resource. Therefore, the problem in the related art that user experience is affected by simultaneous transmissions of the phase tracking reference signal and another signal in a time-domain code division multiplexing mode can be solved, the phase tracking reference signal and another signal in the time-domain code division multiplexing mode are not simultaneously transmitted, and thereby the user experience is improved.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure and do not limit the present disclosure in any improper way. In the drawings:

FIG. 4 is flowchart two of a signal receiving method according to an embodiment of the present disclosure;

FIG. 5 is a flowchart of a method for receiving a configuration resource according to an embodiment of the present disclosure;

FIG. 6 is a schematic diagram of a demodulation reference signal according to this embodiment;

FIG. 9 is a schematic diagram of DMRS ports allocated to a user according to this embodiment;

FIG. 10 is a schematic diagram of DMRS symbols according to this embodiment;

DETAILED DESCRIPTION

Hereinafter the present disclosure will be described in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Figure 1:
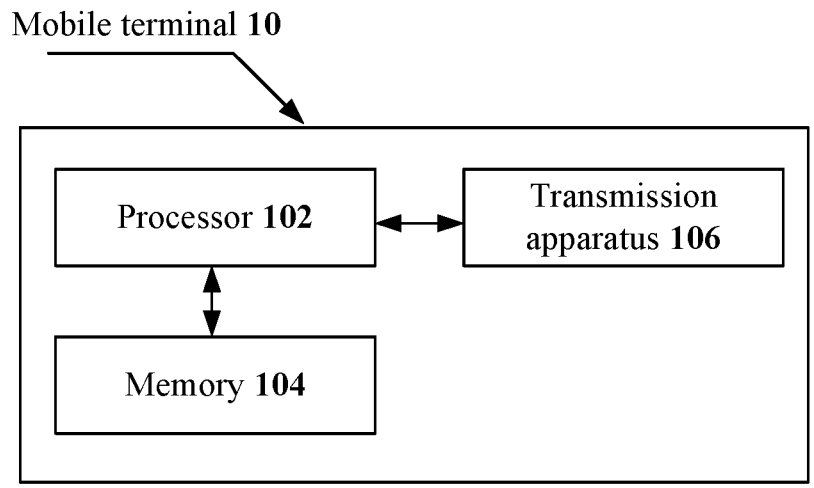
FIG. 1 is a block diagram of hardware of a mobile terminal of a signal sending method according to an embodiment of the present disclosure.

A method embodiment provided by embodiment one of the present application may be performed in a mobile terminal, a computer terminal or other similar computing apparatuses. Taking a method performed in the mobile terminal as an example, FIG. 1 is a block diagram of hardware of a mobile terminal of a signal sending method according to an embodiment of the present disclosure. As shown in FIG. 1, a mobile terminal 10 may include one or more (merely one is shown in FIG. 1) processors 102 (the processor 102 may include, but is not limited to, a processing apparatus such as a microcontroller unit (MCU) and a field programmable gate array (FPGA)), a memory 104 used for storing data, and a transmission apparatus 106 used for implementing a communication function. It should be understood by those skilled in the art that the structure shown in FIG. 1 is merely illustrative, and not intended to limit the structure of the electronic apparatus described above. For example, the mobile terminal 10 may further include more or fewer components than the components shown in FIG. 1, or may have a configuration different from the configuration shown in FIG. 1.

The memory 104 may be used for storing software programs and modules of application software, such as program instructions or modules corresponding to the signal sending method in the embodiments of the present disclosure. The processor 102 executes the software programs and modules stored in the memory 104 so as to perform various function applications and data processing, that is, to implement the method described above. The memory 104 may include a high-speed random access memory, and may further include a nonvolatile memory such as one or more magnetic storage apparatuses, flash memories or other nonvolatile solid-state memories. In some examples, the memory 104 may further include memories that are remotely disposed with respect to the processor 102. These remote memories may be connected to the mobile terminal 10 via a network. Examples of the preceding network include, but are not limited to, the Internet, an intranet, a local area network, a mobile communication network and a combination thereof.

The transmission apparatus 106 is configured to receive or send data via a network. Specific examples of the preceding network may include a wireless network provided by a communication provider of the mobile terminal 10. In one example, the transmission apparatus 106 includes a network interface controller (NIC), which may be connected to other network devices via a base station and thus is capable of communicating with the Internet. In one example, the transmission apparatus 106 may be a radio frequency (RF) module, which is used for communicating with the Internet in a wireless way.

Figure 2:
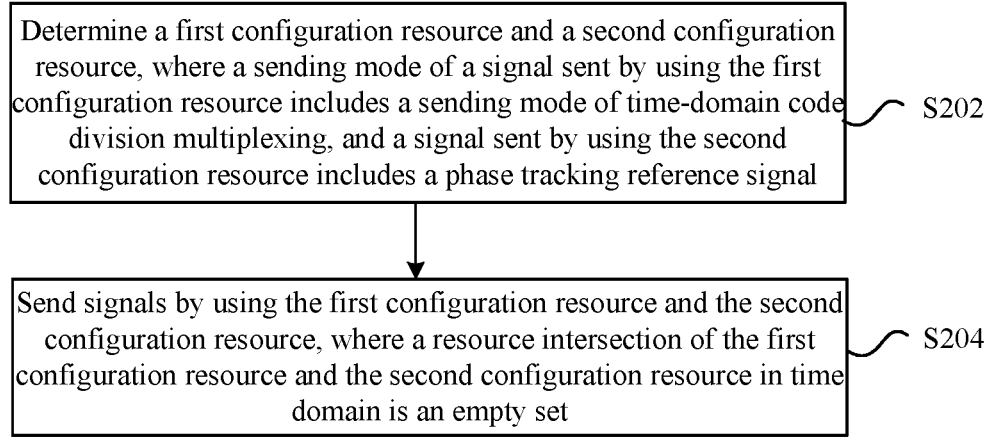
FIG. 2 is a flowchart of a signal sending method according to an embodiment of the present disclosure.

A signal sending method is provided in this embodiment. FIG. 2 is a flowchart of a signal sending method according to an embodiment of the present disclosure. As shown in FIG. 2, the method includes steps S202 and S204 described below.

In step S202, a first configuration resource and a second configuration resource are determined, where a sending mode of a signal sent by using the first configuration resource includes a sending mode of time-domain code division multiplexing, and a signal sent by using the second configuration resource includes a phase tracking reference signal.

In step S204, signals are sent by using the first configuration resource and the second configuration resource, where a resource intersection of the first configuration resource and the second configuration resource in time domain is an empty set.

In this embodiment, for a same user, a base station does not simultaneously configure the signal sent by using the first configuration resource and the signal sent by using the second configuration resource to the user. Alternatively, for the same user, the base station configures the signal sent by using the first configuration resource and the signal sent by using the second configuration resource for the user, but the base station does not simultaneously send the signal transmitted by using the first configuration resource and the signal transmitted by using the second configuration resource to the user. From the perspective of the user, the user does not desire to be simultaneously configured with the signal sent by using the first configuration resource and the signal sent by using the second configuration resource. Alternatively, the user does not desire to simultaneously receive the signal sent by using the first configuration resource and the signal sent by using the second configuration resource.

Through the steps described above, after a sending end determines the first configuration resource and the second configuration resource, where the sending mode of the signal sent by using the first configuration resource includes the sending mode of time-domain code division multiplexing, and the signal sent by using the second configuration resource includes the phase tracking reference signal, the sending end sends the signals to a receiving end by using the first configuration resource and the second configuration resource, where the resource intersection in the time domain of the first configuration resource and the second configuration resource is the empty set. In this way, the sending end does not simultaneously send the signal transmitted by using the first configuration resource and the signal transmitted by using the second configuration resource. Therefore, the problem in the related art that user experience is affected by simultaneous transmissions of the phase tracking reference signal and another signal in a time-domain code division multiplexing mode can be solved, the phase tracking reference signal and another signal in the time-domain code division multiplexing mode are not simultaneously transmitted, and thereby the user experience is improved.

The steps described above may, but may not necessarily, be executed by the base station.

In one embodiment, the signal sent by using the first configuration resource includes at least one of: an uplink demodulation reference signal, a downlink demodulation reference signal, a channel state information-reference signal or an uplink control channel.

In one embodiment, the phase tracking reference signal is configured through one of the following signaling: higher-layer signaling, or physical layer dynamic signaling and the higher-layer signaling. The higher-layer signaling here may be signaling at a layer above the physical layer, e.g., data link layer signaling or medium access medium layer signaling.

At least two of orthogonal codes used in code division multiplexing of the first configuration resource are used. In this way, at least two orthogonal codes are used, achieving orthogonality of signals sent by using the first configuration resource.

In some embodiments, the signal sent by using the first configuration resource uses orthogonal code [1 −1]. The orthogonal code includes an orthogonal cover code, but is not limited to the orthogonal cover code. In one embodiment, a time-domain density of the phase tracking reference signal is greater than N, where N is a positive number.

Figure 3:
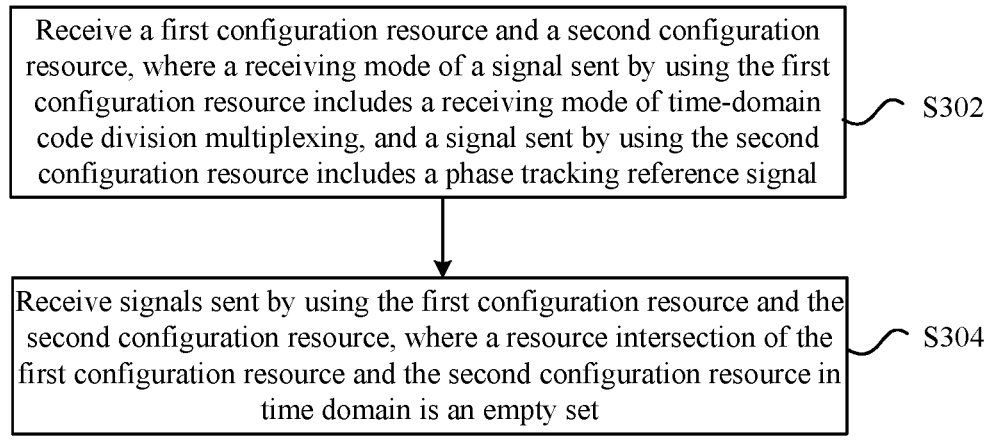
FIG. 3 is flowchart one of a signal receiving method according to an embodiment of the present disclosure.

A signal receiving method 1 is provided in this embodiment. FIG. 3 is flowchart one of the signal receiving method according to an embodiment of the present disclosure. As shown in FIG. 3, the process of the method includes steps S302 and S304 described below. In step S302, a first configuration resource and a second configuration resource are received, where a receiving mode of a signal sent by using the first configuration resource includes a receiving mode of time-domain code division multiplexing, and the signal sent by using the second configuration resource includes a phase tracking reference signal.

In step S304, signals sent by using the first configuration resource and the second configuration resource are received, where a resource intersection of the first configuration resource and the second configuration resource in time domain is an empty set.

The signal sent by using the first configuration resource includes at least one of: an uplink demodulation reference signal, a downlink demodulation reference signal, a channel state information-reference signal or an uplink control channel.

In some embodiments, the phase tracking reference signal is determined through one of the following signaling: higher-layer signaling, or physical layer dynamic signaling and the higher-layer signaling.

In some embodiments, a time-domain density of the phase tracking reference signal is greater than N, where N is a positive number.

In some embodiments, at least two of orthogonal codes used in code division multiplexing of the first configuration resource are used.

The signal sent by using the first configuration resource uses orthogonal code [1 −1]. In this embodiment, a signal multiplexing mode in the above steps of the present disclosure is generally defined on adjacent or consecutive time-domain symbols; since the signal sent by using the first configuration resource on inconsecutive time-domain symbols has a poor time-domain code division multiplexing effect, the signal sent by using the first configuration resource is configured on multiple consecutive time-domain symbols.

Through the steps described above, after a receiving end receives the first configuration resource and the second configuration resource, where the first configuration resource includes the receiving mode of the signal, the receiving mode includes the receiving mode of time-domain code division multiplexing, and the signal sent by using the second configuration resource includes the phase tracking reference signal, the first configuration resource is configured according to whether the signal sent by using the first configuration resource and the signal sent by using the second configuration resource overlap in the time domain. Therefore, the problem in the related art that user experience is affected by simultaneous reception of the phase tracking reference signal and another signal in the time-domain code division multiplexing mode can be solved, and thereby the user experience is improved.

The steps described above may, but may not necessarily, be executed by a terminal.

In one embodiment, when the signal sent by using the first configuration resource and the signal sent by using the second configuration resource overlap in the time domain, configuring the first configuration resource includes: changing the receiving mode in the time domain of the signal sent by using the first configuration resource from the code division multiplexing to another mode other than the code division multiplexing.

In one embodiment, when the signal sent by using the first configuration resource and the signal sent by using the second configuration resource overlap in the time domain, configuring the first configuration resource includes: increasing a processing delay for demodulating the signal sent by using the first configuration resource.

In one embodiment, when the signal sent by using the first configuration resource and the signal sent by using the second configuration resource overlap in the time domain, configuring the first configuration resource includes: the phase tracking reference signal being quasi-co-located (QCL) with the signal on the first configuration resource.

In one embodiment, the signal includes at least one of: the uplink demodulation reference signal, the downlink demodulation reference signal, the channel state information-reference signal or the uplink control channel.

In one embodiment, the phase tracking reference signal is determined through one of the following signaling: the higher-layer signaling or the physical layer dynamic signaling.

In the related art, due to a flexible pattern design of the demodulation reference signal, large physical layer dynamic signaling overheads are required for dynamically notifying parameters of the demodulation reference signal. How to reduce the overheads without reducing the transmission efficiency also becomes a big problem. The technical solution to the problem of large overheads for configuring or receiving the demodulation reference signal described above is described below.

A signal receiving method 2 is provided in this embodiment. FIG. 4 is flowchart two of a signal receiving method according to an embodiment of the present disclosure. As shown in FIG. 4, the process of the method includes step S402 described below.

In step S402, an association relationship between a predetermined relationship and information about a configuration resource is established, where the predetermined relationship includes a relationship between a demodulation reference signal and data corresponding to the demodulation reference signal; the predetermined relationship includes at least one of: whether a multiplexing mode of the demodulation reference signal and the corresponding data includes frequency division multiplexing, or a power parameter ratio of the demodulation reference signal to the corresponding data; the information about the configuration resource includes at least one of: the number of time-domain symbols included in a sending unit, the number of time-domain symbols of the demodulation reference signal included in the sending unit, the number of time-domain symbols included in a scheduled allocated to a receiving end in the sending unit, or a time-domain spacing of the demodulation reference signal included in the sending unit; the information about the configuration resource is various types of information for indicating or describing the configuration resource.

Through the step described above, a sending end establishes the association relationship between the predetermined relationship and the information about the configuration resource. The predetermined relationship includes the relationship between the demodulation reference signal and the data corresponding to the demodulation reference signal.

The predetermined relationship includes at least one of: whether the multiplexing mode of the demodulation reference signal and the corresponding data includes the frequency division multiplexing, or the power parameter ratio of the demodulation reference signal to the corresponding data. The information about configuration resource includes at least one of: the number of time-domain symbols included in the sending unit, the number of time-domain symbols of the demodulation reference signal included in the sending unit, the number of time-domain symbols included in the scheduled resource allocated to the receiving end in the sending unit, or the time-domain spacing of the demodulation reference signal included in the sending unit. Therefore, the problem of large overheads for configuring the demodulation reference signal in the related art can be solved, and thereby the overheads are reduced.

The step described above may, but may not necessarily, be executed by a base station.

In one embodiment, when the number of time-domain symbols included in the sending unit or the number of time-domain symbols included in the scheduled resource allocated to the receiving end in the sending unit is greater than X1, the multiplexing mode of the demodulation reference signal and the corresponding data does not include the frequency division multiplexing, where X1 is an integer. In one embodiment, when the number of time-domain symbols included in the sending unit or the number of time-domain symbols included in the scheduled resource allocated to the receiving end in the sending unit is less than or equal to X1, the multiplexing mode of the demodulation reference signal and the corresponding data includes the frequency division multiplexing.

In one embodiment, when the number of time-domain symbols included in the sending unit or the number of time-domain symbols included in the scheduled resource allocated to the receiving end in the sending unit is greater than X1, the power parameter ratio of the demodulation reference signal to the corresponding data is greater than Y, where both X1 and Y are integers. In this embodiment, when the number of time-domain symbols included in the sending unit or the number of time-domain symbols included in the scheduled resource allocated to the receiving end in the sending unit is less than or equal to X1, the power parameter ratio of the demodulation reference signal to the corresponding data is less than or equal to Y.

In one embodiment, when the number of time-domain symbols of the demodulation reference signal included in the sending unit is less than X2, the multiplexing mode of the demodulation reference signal and the corresponding data does not include the frequency division multiplexing (FDM), where X2 is an integer. In this embodiment, when the number of time-domain symbols of the demodulation reference signal included in the sending unit is greater than or equal to X2, the multiplexing mode of the demodulation reference signal and the corresponding data includes the FDM.

In one embodiment, when the number of time-domain symbols of the demodulation reference signal included in the sending unit is less than X2, the power parameter ratio of the demodulation reference signal to the corresponding data is greater than Y, where both X2 and Y are integers. In this embodiment, when the number of time-domain symbols of the demodulation reference signal included in the sending unit is greater than or equal to X2, the power parameter ratio of the demodulation reference signal to the corresponding data is less than or equal to Y.

In one embodiment, when the time-domain spacing of the demodulation reference signal in the sending unit is less than Z, the multiplexing mode of the demodulation reference signal and the corresponding data does not include the frequency division multiplexing, where Z is an integer. In this embodiment, when the time-domain spacing of the demodulation reference signal in the sending unit is greater than or equal to Z, the multiplexing mode of the demodulation reference signal and the corresponding data includes the frequency division multiplexing.

In one embodiment, when the time-domain spacing of the demodulation reference signal in the sending unit is less than Z, the power parameter ratio of the demodulation reference signal to the corresponding data is greater than Y, where both Z and Y are integers. In this embodiment, when the time-domain spacing of the demodulation reference signal in the sending unit is greater than or equal to Z, the power parameter ratio of the demodulation reference signal to the corresponding data is less than or equal to Y.

A method for receiving a configuration resource is provided in this embodiment. FIG. 5 is a flowchart of a method for receiving a configuration resource according to an embodiment of the present disclosure. As shown in FIG. 5, the process of the method includes step S502 described below.

In step S502, an association relationship, configured by a sending end, between a predetermined relationship and information about the configuration resource is received, where the predetermined relationship includes a relationship between a demodulation reference signal and data corresponding to the demodulation reference signal; the predetermined relationship includes at least one of: whether a multiplexing mode of the demodulation reference signal and the corresponding data includes frequency division multiplexing (FDM), or a power parameter ratio of the demodulation reference signal to the corresponding data; the information about the configuration resource includes at least one of: the number of time-domain symbols included in a receiving unit of a receiving end, the number of time-domain symbols of the demodulation reference signal included in the receiving unit of the receiving end, the number of time-domain symbols included in a scheduled resource in the receiving unit of the receiving end, or a time-domain spacing of the demodulation reference signal included in the receiving unit of the receiving end.

Through the step described above, the receiving end receives the predetermined relationship and the configuration resource configured by the sending end. The predetermined relationship includes the relationship between the demodulation reference signal and the data corresponding to the demodulation reference signal. The predetermined relationship includes at least one of: whether the multiplexing mode of the demodulation reference signal and the corresponding data includes the frequency division multiplexing (FDM), or the power parameter ratio of the demodulation reference signal to the corresponding data. The information about configuration resource includes at least one of: the number of time-domain symbols included in the receiving unit of the receiving end, the number of time-domain symbols of the demodulation reference signal included in the receiving unit of the receiving end, the number of time-domain symbols included in the scheduled resource in the receiving unit of the receiving end, or the time-domain spacing of the demodulation reference signal included in the receiving unit of the receiving end. Therefore, the problem of large overheads for receiving the demodulation reference signal in the related art can be solved, and thereby the overheads are reduced.

The step described above may, but may not necessarily, be executed by a terminal.

In one embodiment, when the number of time-domain symbols included in the receiving unit of the receiving end or the number of time-domain symbols included in the scheduled resource in the receiving unit of the receiving end is greater than X1, the multiplexing mode of the demodulation reference signal and the corresponding data does not include the frequency division multiplexing (FDM), where X1 is an integer.

In one embodiment, when the number of time-domain symbols included in the receiving unit of the receiving end or the number of time-domain symbols included in the scheduled resource in the receiving unit of the receiving end is greater than X1, the power parameter ratio of the demodulation reference signal to the corresponding data is greater than Y, where both X1 and Y are integers.

In one embodiment, when the number of time-domain symbols of the demodulation reference signal included in the receiving unit of the receiving end is less than X2, the multiplexing mode of the demodulation reference signal and the corresponding data does not include the FDM, where X2 is an integer.

In one embodiment, when the number of time-domain symbols of the demodulation reference signal included in the receiving unit of the receiving end is less than X2, the power parameter ratio of the demodulation reference signal to the corresponding data is greater than Y; when the number of time-domain symbols of the demodulation reference signal included in the receiving unit of the receiving end is greater than or equal to X2, the power parameter ratio of the demodulation reference signal to the corresponding data is less than or equal to Y; where both X2 and Y are integers.

In one embodiment, when the time-domain spacing of the demodulation reference signal in the receiving unit of the receiving end is less than Z, the multiplexing mode of the demodulation reference signal and the corresponding data does not include the frequency division multiplexing, where Z is an integer.

In one embodiment, when the time-domain spacing of the demodulation reference signal in the receiving unit of the receiving end is less than Z, the power parameter ratio of the demodulation reference signal to the corresponding data is greater than Y, where both Z and Y are integers.

In the embodiments described below, a first communication node may be a base station and a second communication node may be a user (terminal). In addition, it is not excluded that the first communication node is the user or the base station and the second communication node is the base station or the user.

This embodiment provides a method for sending a configuration of related signaling. The method may include the content described below.

A first configuration resource is determined, where a signal sent by using the first configuration resource adopts a sending mode of time-domain code division multiplexing. A second configuration resource is determined, where a configuration of a phase tracking reference signal exists on the second configuration resource. A resource intersection in the time domain of the first configuration resource and the second configuration resource in time domain is an empty set. The first communication node configures a set of first configuration resources and a set of second configuration resources for the second communication node.

The signal sent by using the first configuration resource includes one or more of an uplink demodulation reference signal, a downlink demodulation reference signal, a channel state information-reference signal or an uplink control channel.

The first communication node configures, for the second communication node, whether the phase tracking reference signal exists in one of the following manners: higher-layer signaling, or physical layer dynamic signaling and the higher-layer signaling.

A time-domain density of the phase tracking reference signal is greater than N.

This embodiment will be described from the perspective of a receiving end. A method for receiving a joint configuration of related signaling may include the content described below.

Information about a first configuration resource and a second configuration resource is received. A signal sent by using the first configuration resource adopts a sending mode of time-domain code division multiplexing. A configuration of a phase tracking reference signal exists on the second configuration resource. If the first configuration resource and the second configuration resource overlap in the time domain, the sending mode in the time domain of the signal sent by using the first configuration resource is changed from code division multiplexing to another mode.

The information about the first configuration resource and the second configuration resource is received. The signal sent by using the first configuration resource adopts the sending mode of time-domain code division multiplexing. The configuration of the phase tracking reference signal exists on the second configuration resource. If the first configuration resource and the second configuration resource overlap in the time domain, a processing delay for demodulating the signal on the first configuration resource is increased.

The information about the first configuration resource and the second configuration resource is received. The signal sent by using the first configuration resource adopts the sending mode of time-domain code division multiplexing. The configuration of the phase tracking reference signal exists on the second configuration resource. If the first configuration resource and the second configuration resource overlap in the time domain, the phase tracking reference signal is QCL with the signal sent by using the first configuration resource. The signal sent by using the first configuration resource refers to a channel state information-reference signal.

The signal sent by using the first configuration resource includes one or more of an uplink demodulation reference signal, a downlink demodulation reference signal, the channel state information-reference signal or an uplink control channel.

The first communication node configures, for the second communication node, whether the phase tracking reference signal exists in one of the following manners: higher-layer signaling, or physical layer dynamic signaling and the higher-layer signaling.

A time-domain density of the phase tracking reference signal on the second configuration resource is greater than N.

This embodiment provides a configuration method for establishing a configuration. The method may include steps described below.

A first communication node jointly configures a relationship between a demodulation reference signal and corresponding data, and a configuration resource. The configuration resource includes at least one of: the number of time-domain symbols included in a sending unit, the number of time-domain symbols of the demodulation reference signal included in the sending unit, the number of time-domain symbols included in a scheduled resource allocated to a second communication node in the sending unit, or a time-domain spacing of the demodulation reference signal in the sending unit.

The configured relationship between the demodulation reference signal and the corresponding data refers to at least one of: whether a multiplexing mode of the demodulation reference signal and the corresponding data includes FDM, or a power parameter ratio of the demodulation reference signal to the data. When the number of symbols of the configuration resource is greater than X1, the multiplexing mode of the demodulation reference signal and the corresponding data does not include the FDM. When the number of symbols of the configuration resource is less than or equal to X1, the multiplexing mode of the demodulation reference signal and the corresponding data includes the frequency division multiplexing (FDM).

When the number of symbols of the configuration resource is greater than X1, the power parameter ratio of the demodulation reference signal to the corresponding data is greater than Y; when the number of symbols of the configuration resource is less than or equal to X1, the power parameter ratio of the demodulation reference signal to the data is less than or equal to Y, where Y is an integer.

The number of symbols of the configuration resource refers to the number of time-domain symbols included in the sending unit or the number of time-domain symbols included in the scheduled resource allocated to the second communication node in the sending unit.

In this case, the configuration resource refers to the number of time-domain symbols of the demodulation reference signal included in the sending unit, and the number is less than X3, where X3 is an integer.

When the number of symbols of the configuration resource is less than X2, the multiplexing mode of the demodulation reference signal and the corresponding data does not include the FDM. When the number of symbols of the configuration resource is greater than or equal to X2, the multiplexing mode of the demodulation reference signal and the corresponding data includes the FDM.

When the number of symbols of the configuration resource is less than X2, the power parameter ratio of the demodulation reference signal to the corresponding data is greater than Y; when the number of symbols of the configuration resource is greater than or equal to X2, the power parameter ratio of the demodulation reference signal to the data is less than or equal to Y, where Y is an integer.

In this case, the number of symbols of the configuration resource refers to the number of time-domain symbols of the demodulation reference signal included in the sending unit. Moreover, the number of time-domain symbols included in the sending unit or the scheduled resource is greater than X4, where X4 is an integer.

When the configuration resource refers to the time-domain spacing of the demodulation reference signal in the sending unit, if the spacing is less than Z, the multiplexing mode of the demodulation reference signal and the corresponding data does not include the FDM, where Z is an integer. If the spacing is greater than or equal to Z, the multiplexing mode of the demodulation reference signal and the corresponding data includes the FDM.

When the configuration resource refers to the time-domain spacing of the demodulation reference signal in the sending unit, the power parameter ratio of the demodulation reference signal to the corresponding data is greater than Y if the time-domain spacing is less than Z. If the time-domain spacing is greater than or equal to Z, the power parameter ratio of the demodulation reference signal to the corresponding data is less than or equal to Y.

A method for receiving a signaling configuration of power of a demodulation reference signal will be described from the perspective of a receiving end. The method may include the content described below.

A relationship between the demodulation reference signal and corresponding data, and the number of time-domain symbols of a configuration resource, which are jointly configured, are received. The number of time-domain symbols of the configuration resource includes at least one of: the number of time-domain symbols included in a receiving unit, the number of time-domain symbols of the demodulation reference signal included in the receiving unit, the number of time-domain symbols included in a scheduled resource allocated to a second communication node in the receiving unit.

The configured relationship between the demodulation reference signal and the corresponding data refers to at least one of: whether a multiplexing mode of the demodulation reference signal and the data includes FDM, or a power parameter ratio of the demodulation reference signal to the data.

When the number of symbols of the configuration resource is greater than X1, the multiplexing mode of the demodulation reference signal and the corresponding data does not include the FDM. When the number of symbols of the configuration resource is less than or equal to X1, the multiplexing mode of the demodulation reference signal and the corresponding data includes the frequency division multiplexing (FDM).

When the number of symbols of the configuration resource is greater than X1, the power parameter ratio of the demodulation reference signal to the corresponding data is greater than Y; when the number of symbols of the configuration resource is less than or equal to X1, the power parameter ratio of the demodulation reference signal to the data is less than or equal to Y, where Y is an integer.

In this case, the number of symbols of the configuration resource refers to the number of time-domain symbols included the receiving unit or the number of time-domain symbols included in the scheduled resource allocated to the second communication node in the receiving unit. Moreover, the number of time-domain symbols of the demodulation reference signal included in the receiving unit is less than X3.

When the number of symbols of the configuration resource is less than X2, the multiplexing mode of the demodulation reference signal and the corresponding data does not include the FDM. When the number of symbols of the configuration resource is greater than or equal to X2, the multiplexing mode of the demodulation reference signal and the corresponding data includes the FDM.

When the number of symbols of the configuration resource is less than X2, the power parameter ratio of the demodulation reference signal to the corresponding data is greater than Y; when the number of symbols of the configuration resource is greater than or equal to X3, the power parameter ratio of the demodulation reference signal to the data is less than or equal to Y, where Y is an integer.

In this case, the number of symbols of the configuration resource refers to the number of time-domain symbols of the demodulation reference signal included in the receiving unit.

Moreover, the number of time-domain symbols included in the receiving unit or the scheduled resource is greater than X4.

The first communication node may be a base station, and the second communication node may be a terminal.

This embodiment provides a method for sending a configuration of related signaling. The method includes steps described below.

A first configuration resource is determined, where a signal sent by using the first configuration resource adopts a sending mode of time-domain code division multiplexing.

A second configuration resource is determined, where a signal sent by using the second configuration resource includes a phase tracking reference signal and the phase tracking reference signal exists. An intersection in the time domain of the first configuration resource and the signal sent by using the second configuration resource in time domain is an empty set.

A first communication node configures the first configuration resource and the second configuration resource for a second communication node. That is, a base station configures time-domain multiplexing modes of some signals for a user via the first configuration resource. These signals include one or more of an uplink demodulation reference signal, a downlink demodulation reference signal (DMRS), a channel state information-reference signal (CSI-RS) or a physical uplink control channel (PUCCH). The base station configures the phase tracking reference signal for the user via the second configuration resource. When signals in a set of first configuration resources and signals in a set of second configuration resources are sent, the signals have no intersection in the time domain. That is, if the phase tracking reference signal (PTRS) is configured for the second configuration resource, a time-domain multiplexing mode configured for the signal sent by using the first configuration resource cannot be code division multiplexing. In other words, the user does not desire to be configured to simultaneously receive the phase tracking reference signal and receive the signal sent by using the first configuration resource, where the signal sent by using the first configuration resource uses the time-domain code division multiplexing. In particular, too great a density of the phase tracking reference signal results in serious phase-noise influence, so code division demodulation cannot be simultaneously used. If a UE can simultaneously receive the configured phase tracking reference signal and another signal adopting the sending mode of time-domain code division multiplexing, some parameters of the PTRS and another signal quasi-co-located (QCL) with the PTRS have to be assumed to be the same, or the time-domain multiplexing mode of another reference signal has to be changed from a code division mode to another mode.

The code division mode in this embodiment refers to that multiple codes, instead of merely one code, included in an orthogonal code may be applied. That is, at least two orthogonal codes are used in the code division multiplexing.

For example, a code length of an orthogonal cover code (OCC) is 2, and then the code division multiplexing mode refers to that both [1 1] and [1 −1] may be used. If the user or a demodulation reference signal port can only use [1 1], the mode is practically a simple repetition in the time domain and cannot be regarded as the code division multiplexing. Alternatively, for the OCC with the length of 2, only when sequence [1 −1] can be applied, the mode is regarded as the code division multiplexing. If sequence [1 1] is configured, the mode cannot be regarded as the code division multiplexing (CDM) in this embodiment and is simple repeated transmission.

FIG. 6 is a schematic diagram of the demodulation reference signal in this embodiment. As shown in FIG. 6, when the demodulation reference signal generally occupies two adjacent time-domain symbols, different demodulation reference signals may be simultaneously transmitted in the code division multiplexing mode in the time domain, and demodulation reference signal ports using the code division multiplexing occupy a same time-frequency resource. For example, if port 1 and port 2 are code division multiplexed in the time domain, e.g., by using the OCC, port 1 may use OCC sequence [1 1], port 2 may use OCC sequence [1 −1], and port 1 and port 2 occupy two adjacent time-domain symbols on a same subcarrier. The advantage of time-domain code division is code division gains, which is quite beneficial on a low frequency band.

However, on a high frequency band, due to the influence of phase noises, the application of the time-domain OCC will be affected in the case where two adjacent OFDM symbols are configured for the reference signal for DMRS transmission. This is because the phase noises will generate phase rotations for channels of different OFDM symbols, so that channels on adjacent OFDM symbols are different, degrading channel estimation performance. Therefore, when the phase noises exist at the high frequency, it is better not to use the time-domain OCC. Time division multiplexing (TDM) or simple repeated calculations may be used (or only sequence code [1 1] is used and [1 −1] is not used).

Similarly, for another signal, such as the CSI-RS or the PUCCH, whether the multiplexing mode in the time domain adopts the time-domain OCC depends on the influence of the phase noises. The PUCCH is an uplink control channel used by the user to feed back an acknowledgement or non-acknowledgement (ACK or NACK) or CSI. In general, since the PUCCH with a long format may occupy multiple time-domain symbols, whether the influence of the phase noises exists needs to be considered for determining whether to adopt the OCC in the time domain. Similarly, if the CSI-RS occupies multiple time-domain symbols in the time domain, whether the influence of the phase noises exists also needs to be considered for determining whether to adopt the time-domain OCC.

At the high frequency, if the influence of the phase noises exists, the base station will configure the phase tracking reference signal for the user through higher-layer signaling, e.g., RRC signaling, to prove the existence of the phase noises. Due to the existence of the phase noises, the time-domain code division cannot work well, so the base station should not configure, for the user, the demodulation reference signal, the CSI-RS, the PUCCH or the like with the code division multiplexing as the time-domain multiplexing mode, but should configure other time-domain multiplexing modes for these signals, e.g., the time division multiplexing (TDM) or simple port repetitions. In other words, the user does not desire to be simultaneously configured with the phase tracking reference signal and another reference signal whose port multiplexing mode in the time domain is the code division multiplexing. In this case, the phase tracking reference signal is configured by the base station through the higher-layer signaling. Therefore, the base station can make limitations. That is, the base station cannot simultaneously configure the phase tracking reference signal to be transmitted and another reference signal adopting the sending mode of time-domain code division multiplexing. Another reference signal includes at least one of: the uplink demodulation reference signal, the downlink demodulation reference signal, the channel state information-reference signal (CSI-RS) or the physical uplink control channel (PUCCH). It is worth noting that the base station configures the phase tracking reference signal for the user through the higher-layer signaling, which does not necessarily prove the existence of the phase tracking reference signal. In this case, it can only prove the possible existence of the phase noises, and whether the PTRS is practically sent is also related to other physical layer dynamic signaling. This is because the phase noises are not required when the data corresponds to smaller bandwidth and a lower modulation and coding scheme (MCS).

In addition, the higher-layer signaling for configuring the phase tracking reference signal not only includes an indication whether the configured phase tracking reference signal exists, but also includes a level threshold of the MCS, a PTRS density (generally referring to a time-domain density) corresponding to the level threshold of the MCS, a level threshold of resource allocation bandwidth, and a PTRS density (generally referring to a frequency-domain density) corresponding to the level threshold of the resource allocation bandwidth. For example, the level threshold of the MCS includes multiple values, MCS1, MCS2 and MCS3, and different level thresholds of the MCS represent different time-domain densities of the phase tracking reference signal. If the PTRS configured through the higher-layer signaling exists and the MCS allocated by the base station to the user is higher in practical resource scheduling, e.g., the scheduled and allocated MCS is greater than MCS3, the time-domain density of the phase tracking reference signal should be 1, that is, the PTRS exists on each time-domain symbol. If the MCS allocated by the base station to the user is not so high, e.g., the allocated MCS is less than MCS3 and greater than MCS2, the time-domain density of the phase tracking reference signal is less than 1. That is, the PTRS exists on each two time-domain symbols, and the time-domain density of the PTRS is regarded to be 0.5. If the MCS allocated by the base station to the user is lower, e.g., the allocated MCS is less than MCS2 and greater than MCS1, the time-domain density of the phase tracking reference signal should be the lowest. That is, the PTRS exists on each four time-domain symbols, and the time-domain density of the PTRS is regarded to be 0.25. If the MCS allocated by the base station to the user is quite low, e.g., the allocated MCS is lower than MCS1, the time-domain density of the phase tracking reference signal should be the lowest, that is, no PTRS is transmitted. Since the level threshold of the MCS is configured by the base station through the higher-layer signaling, the level threshold of the MCS is changeable.

Only considering that the first configuration resource and the second configuration resource are sent to the receiving end when the phase tracking reference signal has a greater density, where the resource intersection in the time domain of the signal sent by using the first configuration resource and the signal sent by using the second configuration resource is the empty set, and that the existence of the phase tracking reference signal is determined through the higher-layer signaling, the higher-layer signaling in this case includes one of: whether the phase tracking reference signal in the higher-layer configuration exists, an MCS level in the higher-layer configuration and the corresponding PTRS density, or an allocation bandwidth level and the corresponding PTRS density. The time-domain density of the phase tracking reference signal is greater than N, which means that PTRS densities corresponding to certain levels of the MCS have to be greater than N. For example, the time-domain density has to be equal to 1. For the configuration of the phase tracking reference signal, the base station configures, through the higher-layer signaling and the physical layer dynamic signaling (the MCS scheduled and allocated to the user, and scheduled bandwidth), whether the phase tracking reference signal is transmitted and the time-domain density of the PTRS in some embodiments. In this case, even if the base station configures the PTRS through the higher-layer signaling, the PTRS exists only when the bandwidth and the MCS allocated to data by the physical layer are greater than their thresholds separately. Otherwise, even if the PTRS is configured through the higher-layer signaling, the PTRS is not to be sent when the bandwidth and the MCS allocated to the data are smaller. Of course, if the PTRS configured through the higher-layer signaling does not exist, the PTRS will not be sent, and the physical layer dynamic signaling is not involved. Therefore, in practice, if the base station configures real transmission of the PTRS through the higher-layer signaling and the physical layer dynamic signaling, the phase noises are certain to exist and the time-domain code division cannot work well. In this case, the base station should not configure, for the user, the demodulation reference signal, the CSI-RS, the PUCCH or the like with the code division multiplexing as the time-domain multiplexing mode, but should configure other time-domain multiplexing modes for these signals, e.g., the TDM or the simple port repetitions. In other words, the user does not desire to be simultaneously configured with the phase tracking reference signal and another reference signal whose port multiplexing mode in the time domain is the code division multiplexing. In this case, the phase tracking reference signal is configured by the base station through the higher-layer signaling and the physical layer dynamic signaling. In other words, when the scheduled bandwidth or the MCS dynamically allocated to the user should be greater than certain level thresholds configured through the higher-level signaling, the PTRS dynamically exists, and the user does not desire the reference signal transmitted by using the first configuration resource to simultaneously exist. Therefore, the base station can make limitations. That is, the base station cannot simultaneously configure the phase tracking reference signal to be transmitted and another reference signal adopting the sending mode of time-domain code division multiplexing. In some embodiments, considering that the time-domain CDM may work when the density of the PTRS existing dynamically is not great, further limitations may be made. That is, when the PTRS dynamically allocated to the user exists and the time-domain density is greater than N, the user does not desire the reference signal transmitted by using the first configuration resource to simultaneously exist. In this case, the scheduled MCS for the user is greater than one level threshold, and the time-domain density of the PTRS corresponding to the threshold is N.

Further explanation for the above two paragraphs is made as follows: since the level threshold of the MCS is configured by the base station through the higher-layer signaling, the level threshold of the MCS has changeable values. For example, the time-domain density of the PTRS corresponding to the highest value of the level threshold of the MCS is still quite small, that is, the scheduled MCS for the user is greater than the highest level threshold, e.g., MCS 3, and the PTRS density is still quite small, e.g., 0.5 or 0.25. In this case, it can be regarded that the phase noises has little influence or that no phase noise exists, and the user may estimate a Doppler influence, instead of the influence of the phase noises, by using the PTRS. In this case, even if the higher-layer configuration of the PTRS exists and the scheduled MCS is higher, that is, the PTRS is transmitted, the time-domain code division may be applied. Only when the configured phase tracking reference signal has a great density, it is regarded that the phase noises exist, and the time-domain code division does not work so well. For example, the density of the phase tracking reference signal corresponding to the level threshold of the MCS in the higher-layer configuration is great, e.g., equal to 1, that is, the density is greater than N, where N=0.5. In other words, the user does not desire to be simultaneously configured with the phase tracking reference signal and another reference signal whose port multiplexing mode in the time domain is the code division multiplexing. In this case, the configuration of the phase tracking reference signal includes the density greater than N. That is, the time-domain density of the PTRS corresponding to the highest level threshold of the modulation and coding scheme (MCS) is greater than N.

Of course, in some cases where the configuration of the phase tracking reference signal includes the density greater than N, if the scheduled MCS for the user is always lower, the time-domain density of the phase tracking reference signal practically dynamically transmitted is also smaller, i.e., less than or equal to N. In this case, it is regarded that the time-domain code division can also work. Therefore, only when the density of the phase tracking reference signal practically dynamically transmitted is greater than N, e.g., N=0.5, that is, the PTRS density is equal to 1, the time-domain code division cannot work. Therefore, the base station will not simultaneously configure the PTRS and another signal with the time-domain code division, and in this case, the PTRS density is greater than N. In other words, the user does not desire to be simultaneously configured with the phase tracking reference signal and another reference signal whose port multiplexing mode in the time domain is the code division multiplexing. In this case, the density of the phase tracking reference signal dynamically transmitted is greater than N.

In addition, the time-domain density of the phase tracking reference signal is related to the time-domain code division multiplexing of a signal transmitted by using a configuration resource. If the time-domain density of the phase tracking reference signal is 0.25, that is, one PTRS RE is sent on each four time-domain OFDM symbols, the phase noises in the time domain is regarded to be not serious and have little influence phases on adjacent OFDM symbols, so the time-domain code division multiplexing of the signal transmitted by using the configuration resource can also work when a length of the time-domain code division multiplexing is 2. That is, OCC 2 may be applied. If the time-domain density of the phase tracking reference signal is 1, the time-domain code division multiplexing cannot be applied, and it can be understood that a length of the OCC used for the code division multiplexing is 1. Therefore, another signaling configuration method is determining a first configuration resource and a second configuration resource, where a sending mode of a signal sent by using the first configuration resource includes a sending mode of time-domain code division multiplexing, and the second configuration resource includes a configuration of a phase tracking reference signal; and a code length adopted by time-domain code division multiplexing of the signal sent by using the first configuration resource has a correspondence with a time-domain density of a signal sent by using the second configuration resource. The code length of the code division multiplexing may have a value among 1, 2 and 4. If the code length is 2, a code includes [1 1] and [1 −1]. If the code length is 4, the code includes [1 1 1 1], [1 −1 1 −1], [1 1 −1 −1] and [1 −1 −1 1].

Of course, from the perspective of a receiving end of a user, in some embodiments, a base station may simultaneously configure the phase tracking reference signal and another reference signal whose port multiplexing mode in the time domain is code division multiplexing, but the user may have different understandings, which may include schemes described below.

Scheme 1: The user regards that no phase tracking reference signal is configured, that is, phase noises have little influence, so the user regards that no PTRS is configured through higher-layer signaling, or configured through the higher-layer signaling and physical layer signaling.

Scheme 2: When the user receives another reference signal, the time-domain multiplexing mode of another reference signal is changed from the time-domain code division multiplexing to another multiplexing mode.

Scheme 3: If the user simultaneously receives the configured phase tracking reference signal and another reference signal adopting the sending mode of time-domain code division multiplexing, a processing delay required by the user for demodulating another reference signal is increased. In this case, the user may regard that the phase noises estimated through the PTRS may be used for demodulating another reference signal. The user needs to first demodulate the PTRS and then use a demodulation result for demodulating another RS, so a greater processing delay is required. In the case of a demodulation reference signal, more time may be required for the user to feed back a corresponding ACK or NACK. In the case of a CSI-RS, the user also needs more time to feed back CSI, and the time for feeding back the CSI is longer than a delay originally predefined or configured.

Scheme 4: Based on scheme 3, if an estimation result of the PTRS is to be used for estimating another RS, e.g., the CSI-RS, and the time-domain multiplexing mode of the CSI-RS is the code division multiplexing, it has to be assumed that the PTRS and the CSI-RS are sent by the same antenna element, so that the estimation result of the phase noises can be shared. Therefore, some parameters of the QCL assumptions the PTRS and the CSI-RS have to be assumed to be the same. In other words, if QCL assumptions of the PTRS and the CSI-RS are different, the time-domain multiplexing mode of the CSI-RS cannot be the code division multiplexing. From the perspective of the user, the user does not desire to be simultaneously configured with the phase tracking reference signal and another reference signal whose port multiplexing mode in the time domain is the code division multiplexing, and some specific QCL parameters of another reference signal and the PTRS are different, e.g., a QCL assumption related to a beam at the receiving end. It is worth noting that QCL parameters may include multiple types of parameters, and the present disclosure emphasizes that the PTRS and the CSI-RS are associated and that some specific parameters are the same. Therefore, if the first configuration resource and the second configuration resource overlap in the time domain, the phase tracking reference signal has to be QCL with the signal sent by using the first configuration resource.

In this embodiment, a first communication node jointly configures a relationship between the demodulation reference signal and corresponding data, and the number of time-domain symbols of a configuration resource. The number of time-domain symbols of the configuration resource includes at least one of: the number of time-domain symbols included in a sending unit, the number of time-domain symbols of the demodulation reference signal included in the sending unit, or the number of time-domain symbols included in a scheduled resource allocated in the sending unit. The configured relationship between the demodulation reference signal and the corresponding data refers to at least one of: whether a multiplexing mode of the demodulation reference signal and the data includes FDM, or a power ratio of the demodulation reference signal to the data. The sending unit may be one slot or multiple slots. The power ratio is described for a demodulation reference signal port. A first demodulation reference signal and corresponding data refers to that the first demodulation reference signal is used for demodulating the corresponding data layer. That is to say, the demodulation reference signal and the corresponding data use the same precoding or correspond to a same port.

When the number of symbols of the configuration resource is greater than X1, the multiplexing mode of the demodulation reference signal and the corresponding data does not include the FDM, where the number of symbols of the configuration resource refers to the number of time-domain symbols included in the sending unit or the number of time-domain symbols included in the scheduled resource allocated to a second communication node. In this case, when the number of symbols of the configuration resource is greater than X1, the power ratio of the demodulation reference signal to the corresponding data is greater than Y; and when the number of symbols of the configuration resource is less than or equal to X1, a power parameter ratio of the demodulation reference signal to the data is less than or equal to Y, where Y is an integer. Moreover, in this case, there is a limitation that the number of time-domain symbols of the demodulation reference signal included in the sending unit is less than X3, where X1, X2 and Y are all integers.

Figure 7:
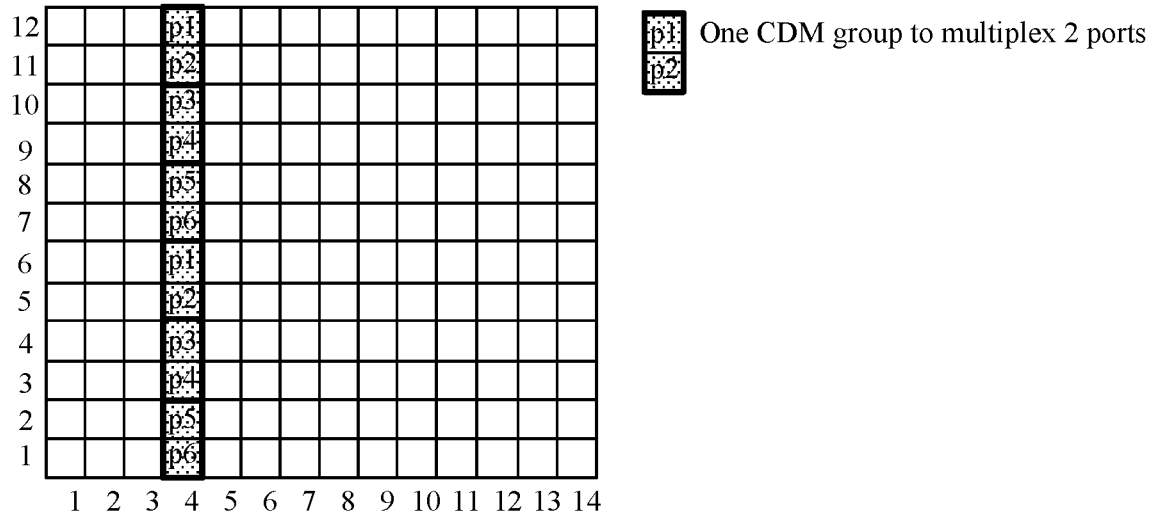
FIG. 7 is schematic diagram one of a transport block size according to this embodiment.

FIG. 7 is a schematic diagram of a transport block size in this embodiment. As shown in FIG. 7, if a size of the configuration resource refers to the number of time-domain symbols included in a slot, the number of symbols included in the slot is 14, i.e. greater than X1, where X1 may be a number less than 14, e.g., 8. In this case, the number of symbols occupied by the demodulation reference signal is 1. In this case, although one time-domain symbol of the demodulation reference signal may support six ports at most, the first communication node do not necessarily transmit the demodulation reference signal through six ports in each slot. In particular, in a cell with fewer users who require fewer demodulation reference signal ports, for example, if only user #1 in the cell uses one port, port p1 as shown in FIG. 7, on the time-domain symbol occupied by the demodulation reference signal, remaining eight REs other than four resource elements (Res) occupied by port p1 may be used for data transmission. In other words, since ports p3 to p6 are not used for sending demodulation reference signals, eight REs occupied by ports p3 to p6 may be used for data transmission. In this case, if the base station sends data to user equipment (UE) #1 on resources occupied by ports p3 to p6, the ports of the data of UE #1 and the demodulation reference signal of UE #1 use the frequency-division multiplexing (FDM).

However, if another user UE #2 in the cell occupies ports p3 to p6, the resources on ports p3 to p6 cannot be used for sending data to UE #1. Therefore, for UE #1, the base station cannot send the data to UE #1 on the resources occupied by ports p3 to p6. Therefore, additional signaling may be required for notifying whether the data and the demodulation reference signal of UE #1 may use the FDM.

However, since the number of symbols of the slot is greater (that is, X1 is greater), that is to say, a great number of resource elements may be used for sending the data, for UE #1, it can be predefined that no data is sent on the time-domain symbol occupied by the demodulation reference signal, so that no additional dynamic control signaling is needed for notifying the user whether the multiplexing mode of the data and the demodulation reference signal includes the FDM because the demodulation reference signal and the data of the user always use predefined time domain multiplexing (TDM). In this case, since the number of symbols of the slot is greater and the number of resource elements available to the data is also greater, as shown in FIG. 7, a total of 120 REs on symbol 5 to symbol 14 are available, so that even if the resources on ports p3 to p6 are used for data transmission, the transmission efficiency can be increased to a small extent and is only 8/120 and less than 7%. Moreover, if the resources on ports p3 to p6 are not used for data transmission, power of the demodulation reference signal of the user can be increased, that is to say, transmit power on ports p3 to p6 may be lent to ports p1 and p2. The power ratio of the demodulation reference signal p1 to the data is 3:1, i.e., greater than Y, which is, for example, 1.

Therefore, if the size of the configuration resource refers to the number of time-domain symbols included in the slot, when the number of symbols included in the slot is greater, the multiplexing mode of the demodulation reference signal and the corresponding data cannot be the FDM, that is, the multiplexing mode can only be the TDM and the demodulation reference signal and the corresponding data are not simultaneously transmitted. In this case, there is a limitation that the number of time-domain symbols of the demodulation reference signal included in the sending unit is less than X3, for example, the number is equal to 1 or 2, that is, X3 is equal to 2 or 3. In this case, the demodulation reference signal tends to occupy a small number of symbols, for example, only 1 symbol or 2 symbols. Otherwise, a huge waste will be caused if no data is transmitted on the time-domain symbol occupied by the demodulation reference signal.

However, if the slot where the demodulation reference signal is located includes a small number of time-domain symbols, for example, the slot is a slot including seven time-domain symbols or a mini slot including, for example, only two time-domain symbols, the huge waste will be caused if no data is transmitted on the time-domain symbols of the demodulation reference signal by default. This is because the remaining eight REs occupy a great proportion of resources on a total of seven symbols if the number of ports is smaller, for example, the base station only sends port p1 to UE #1. If the slot has only two time-domain symbols, even if the overhead of a control channel is not considered, one PRB only includes 24 REs and the proportion of resources occupied by ports p3 to p6 in the slot is one third. In this case, additional signaling is required for notifying whether the demodulation reference signal and the corresponding data may use the FDM. Of course, if the slot includes a small number of symbols and can support a limited number of ports of the demodulation reference signal, it can be regarded by default that the demodulation reference signal and the corresponding data may use the FDM. In other words, when the number of symbols of the configuration resource is less than or equal to X1, the multiplexing mode of the demodulation reference signal and the corresponding data includes the FDM. In this case, the number of symbols of the configuration resource refers to the number of time-domain symbols included the sending unit or the number of time-domain symbols included in the scheduled resource allocated to the second communication node. When the number of symbols of the configuration resource is less than or equal to X1, the power parameter ratio of the demodulation reference signal to the corresponding data is less than or equal to Y; when the number of symbols of the configuration resource is greater than X1, the power parameter ratio of the demodulation reference signal to the data is greater than Y, where Y is an integer, e.g., Y=1. In this case, since the slot includes a small number of symbols, the data needs to be sent on unused ports, and power cannot be lent, the power ratio of the demodulation reference signal to the data is 1:1. The power ratio herein is described for each DMRS port and corresponding data layer.

In this embodiment, when the number of symbols of the configuration resource is less than X2, the multiplexing mode of the demodulation reference signal and the corresponding data does not include the FDM. The number of symbols of the configuration resource refers to the number of time-domain symbols of the demodulation reference signal included in the sending unit. In this case, when the number of symbols of the configuration resource is less than X2, the power parameter ratio of the demodulation reference signal to the corresponding data is greater than Y; and when the number of symbols of the configuration resource is greater than or equal to X2, the power parameter ratio of the demodulation reference signal to the data is less than or equal to Y, where Y is an integer. The number of time-domain symbols included in the sending unit or the scheduled resource tends to be greater than X4, for example, a sending slot includes 14 symbols.

That is to say, if the number of demodulation reference signals in the slot is too small, i.e., less than X2, for example, X2=3, and the number of demodulation reference signals is equal to 2, or X2 may also be equal to 2 and only 1 DMRS symbol exists in the slot, fewer remaining resources on the symbols of the demodulation reference signal are used for transmitting the data, and the DMRS and the data cannot use the FDM by default and can only use the TDM. Since no data is sent, the power ratio of the demodulation reference signal to the corresponding data is greater. That is, a format of the slot or the number of symbols included in the slot is bound to the multiplexing mode of the demodulation reference signal and the data, so that in some cases, no additional dynamic signaling is required for notifying the user of the multiplexing mode of the demodulation reference signal and the data. In the examples described above, the number of symbols included in the slot tends to be greater, that is, X4 is greater.

Figure 8:
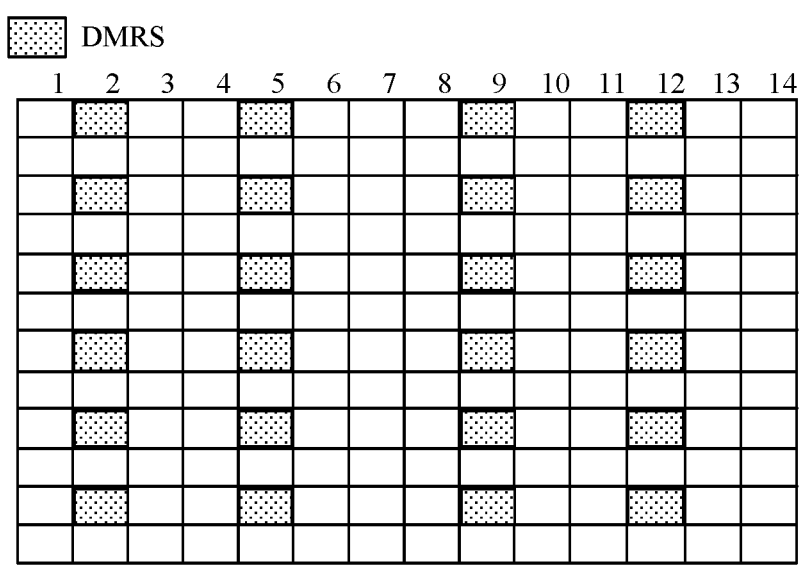
FIG. 8 is a schematic diagram of a demodulation reference signal according to this embodiment.

However, if the demodulation reference signal occupies a great number of time-domain symbols, for example, FIG. 8 is a schematic diagram of the demodulation reference signal in this embodiment, as shown in FIG. 8, the demodulation reference signal occupies 4 time-domain symbols. Since this situation is a single-user scheduling, it can be regarded that the multiplexing mode of the demodulation reference signal and the data includes the FDM. In this case, the power ratio of the DMRS to the corresponding data may be lower, e.g., 1:1. In other words, when the number of symbols of the configuration resource is greater than X2, the multiplexing mode of the demodulation reference signal and the corresponding data includes the FDM. The number of symbols of the configuration resource refers to the number of time-domain symbols of the demodulation reference signal included in the sending unit. In this case, when the number of symbols of the configuration resource is greater than X2, the power parameter ratio of the demodulation reference signal to the corresponding data is less than or equal to Y; and when the number of symbols of the configuration resource is less than or equal to X2, the power parameter ratio of the demodulation reference signal to the data is greater than Y, where Y is an integer. The number of time-domain symbols included in the sending unit or the scheduled resource is greater than X4, for example, the sending slot includes 14 symbols. X includes X1, X2, X3 and X4. A value of Y may be predefined. Optionally, X may be notified through the higher-layer signaling, e.g., RRC signaling.

When information about the configuration resource is used for indicating a time-domain spacing of the demodulation reference signal in the sending unit, if the spacing is less than Z, the multiplexing mode of the demodulation reference signal and the corresponding data does not include the FDM; and if the spacing is greater than or equal to Z, the multiplexing mode of the demodulation reference signal and the corresponding data includes the FDM. In this case, the sending unit should include multiple demodulation reference signal symbols. The present disclosure generally refers to that only 2 DMRS symbols exist in the sending unit. One sending unit or one receiving unit refers to one slot and one slot generally includes 14 time-domain symbols.

When the configuration resource is used for indicating the time-domain spacing of the demodulation reference signal in the sending unit, if the spacing is less than Z, the power parameter ratio of the demodulation reference signal to the corresponding data is greater than Y; and if the spacing is greater than or equal to Z, the power parameter ratio of the demodulation reference signal to the corresponding data is less than or equal to Y.

Figures 9, 10:
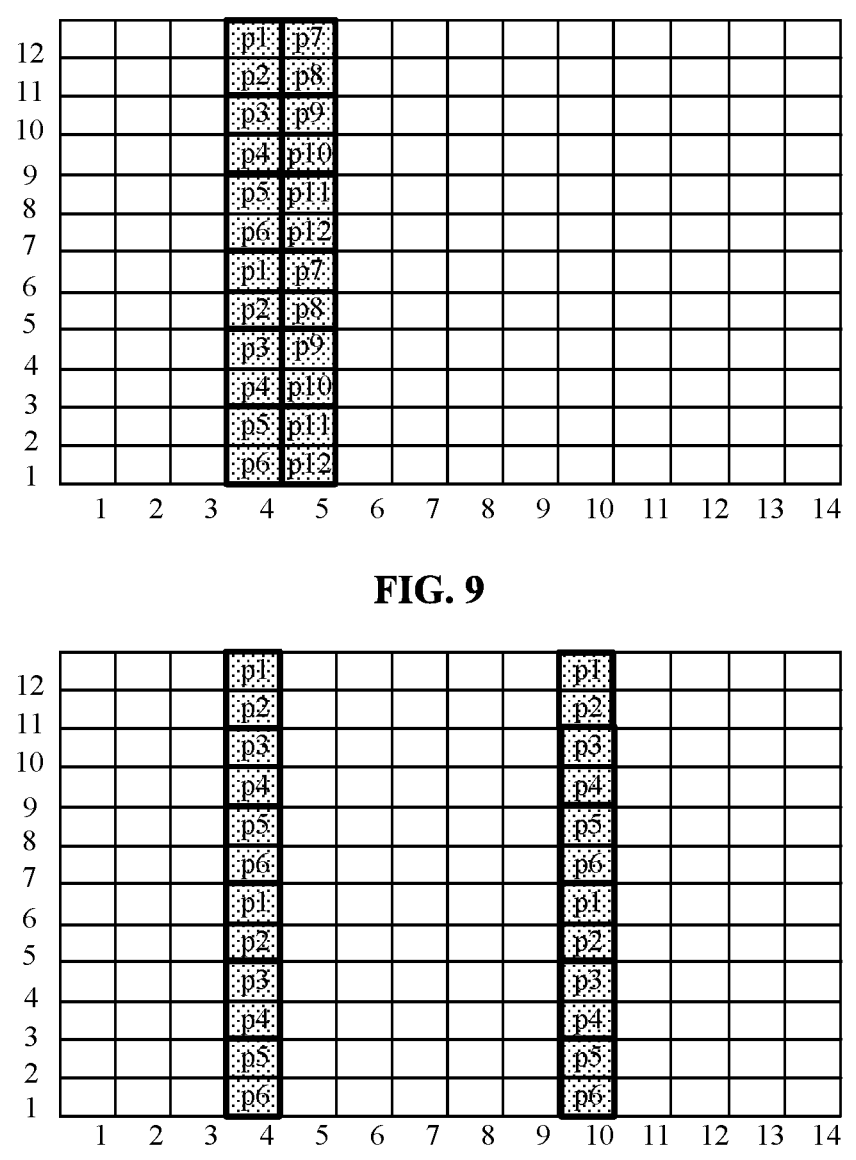

If the allocated demodulation reference signal occupies 2 symbols in the slot and a spacing between the two symbols is less than Z, e.g., Z=2, the spacing between the two symbols is 1, i.e., the two symbols are adjacent. In this case, the base station configures two adjacent DMRS symbols to schedule more DMRS ports for multiple users or a single user, so no data needs to be sent on the DMRS symbols, that is, the multiplexing mode of the demodulation reference signal and the corresponding data does not include the FDM. FIG. 9 is a schematic diagram of DMRS ports allocated to a user in this embodiment. As shown in FIG. 9, if 8 DMRS ports are allocated to the user and are ports p1 to p8, resources occupied by ports p9, p10, p11 and p12 are not used for sending the data. In this case, power of the resources occupied by ports p9, p10, p11 and p12 may be lent to the ports of the user, and the power ratio of the DMRS to the data of the user is greater than 1. That is, when the configuration resource refers to the time-domain spacing of the demodulation reference signal in the sending unit, the power parameter ratio of the demodulation reference signal to the corresponding data is greater than Y when the time-domain spacing is less than Z, where Y=1. Since no data is transmitted on the symbol where the DMRS is located by default, no additional signaling is required for notifying whether data is transmitted on ports p9 to p12, thereby saving the overheads. Otherwise, additional signaling is required since ports p9 to p12 may also be allocated to other users (multi-user scheduling).

However, if the spacing is greater than or equal to Z, the multiplexing mode of the demodulation reference signal and the corresponding data includes the FDM. In this case, the sending unit should include 2 demodulation reference signal symbols. FIG. 10 is a schematic diagram of DMRS symbols in this embodiment. As shown in FIG. 10, the spacing between two DMRS symbols is greater, e.g., greater than Z, where Z=4. In this case, the base station configures two DMRS symbols with a greater spacing to estimate high Doppler influence, so the user has a higher speed. For a high-speed user, the multi-user scheduling is generally difficult to be performed, that is, single-user scheduling is performed. In this case, if the port allocated to the user by the base station is port p1, REs occupied by ports p3 to p6 may be used for sending the data and no additional signaling is required for notification since resources occupied by ports other than port p1 cannot be occupied by other users. That is, the multiplexing mode of the demodulation reference signal and the corresponding data includes the FDM, that is, the demodulation reference signal and the corresponding data may be simultaneously transmitted. In this case, due to the data transmission, the power ratio of the demodulation reference signal to the corresponding data is 1:1, that is, less than or equal to Y, where Y=1.

The FDM in this embodiment does not refer to that the DMRS and the data have to use the FDM. For example, a user occupies ports p1 to p6 in FIG. 10, and the data and the DMRS cannot be simultaneously sent. Therefore, including the FDM herein refers to that the FDM may be executed, and not including the FDM herein refers to that the FDM may not be executed.

In this embodiment, the multiplexing mode of the data and the demodulation reference signal is implicitly determined according to whether two demodulation reference signal symbols are adjacent, so that signaling overheads are saved. Otherwise, explicit dynamic signaling has to be used for indicating the multiplexing mode.

This embodiment provides another signal sending method. The method may include the content described below.

A first configuration resource and a third configuration resource are determined. A sending mode of a signal sent by using the first configuration resource includes a sending mode of time-domain code division multiplexing. A sending mode of a signal sent by using the third configuration resource includes a sending mode other than the time-domain code division multiplexing.

A resource intersection in the time domain of the signal sent by using the first configuration resource and the signal sent by using the third configuration resource in time domain is an empty set.

In some embodiments, the signal sent by using the first configuration resource includes at least one of: an uplink demodulation reference signal, a downlink demodulation reference signal, a channel state information-reference signal or an uplink control channel.

The signal sent by using the third configuration resource includes at least one of: the uplink demodulation reference signal, the downlink demodulation reference signal, the channel state information-reference signal or the uplink control channel.

If a time domain sending mode other than code division multiplexing may be TDM or simple port repetitions. The resource intersection in the time domain of the signal sent by using the first configuration resource and the signal sent by using the third configuration resource is the empty set. That is, for a same user, a base station will not simultaneously configure the signal sent by using the first configuration resource and a signal in a third configuration resource for the user. Alternatively, the base station will not simultaneously send the signal sent by using the first configuration resource and the signal in the third configuration resource to the user. The signal sent by using the first configuration resource and the signal in the third configuration set are different in type. From the perspective of the user, the user does not desire to be simultaneously configured with the signal sent by using the first configuration resource and the signal in the third configuration resource. That is, the user cannot be config-ured with a phase tracking reference signal if the user is configured with the signal sent by using the first configuration resource, or the user does not desire to be configured with the demodulation reference signal, the CSI-RS, the PUCCH or the like with the time-domain code division multiplexing mode if the user is configured with the phase tracking reference signal, or the user does not desire to simultaneously receive the signal sent by using the first configuration resource and the signal in the third configuration resource.

This is because the signal sent by using the first configuration resource adopts the time-domain code division multiplexing which can only work well without phase noises. If the user is simultaneously configured with signals sent by using the third configuration resource and these signals are configured to use the multiplexing mode other than the time-domain code division multiplexing, that is, it is assumed that the phase noises exist, a contradiction occurs in an implementation of the user. The user needs to implement two demodulation methods, which causes a higher slot complexity for the user.

For example, if the signal sent by using the first configuration resource is the downlink demodulation reference signal (DMRS) whose multiplexing mode on two consecutive OFDM symbols is the code division multiplexing, and a signal sent by a second configuration resource is the channel state information-reference signal (CSI-RS) whose multiplexing mode on two or four consecutive OFDM symbols is the time division multiplexing (TDM), the base station cannot simultaneously configure the CSI-RS and the DMRS for the user, or the base station cannot simultaneously send the CSI-RS and the DMRS to the user. That is, the user does not desire to be simultaneously configured with the CSI-RS and the DMRS, where the time-domain multiplexing modes of the CSI-RS and the DMRS are different, that is, the time domain CDM and the multiplexing mode other than the time domain CDM. Alternatively, the user does not desire to simultaneously receive the CSI-RS and the DMRS, where the time-domain multiplexing modes of the CSI-RS and the DMRS are different, that is, the time domain CDM and the multiplexing mode other than the time domain CDM. The CSI-RS and the DMRS are configured on consecutive OFDM symbols.

It is to be noted that a signal multiplexing mode in this embodiment is generally limited on adjacent or consecutive time-domain symbols because the time-domain code division multiplexing has a poor effect if the signal sent by using the first configuration resource or the signal sent by using the third configuration resource are not sent on the consecutive time-domain symbols. Therefore, the signal sent by using the first configuration resource or the signal sent by using the third configuration resource is configured on multiple consecutive time-domain symbols.

From the description of the embodiments described above, it will be apparent to those skilled in the art that the methods in the embodiments described above may be implemented by software plus a necessary general-purpose hardware platform, or may of course be implemented by hardware. However, in many circumstances, the former is a preferred implementation. Based on this understanding, the technical solutions of the present disclosure substantially, or the part contributing to the existing art, may be embodied in the form of a software product. The computer software product is stored in a storage medium (such as a read-only memory (ROM) or random access memory (RAM), a magnetic disk or an optical disk) and includes several instructions for enabling a terminal device (which may be a mobile phone, a computer, a server, a network device or the like) to perform the methods according to the embodiments of the present disclosure.

An apparatus for sending a configuration resource is further provided in this embodiment. The apparatus is used for implementing the embodiments and the implementation modes described above. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 11:
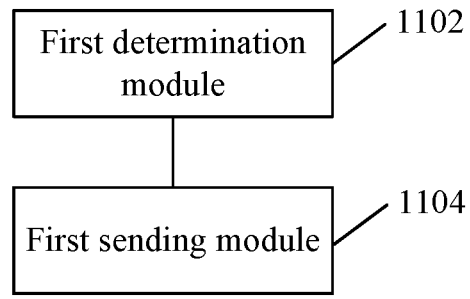
FIG. 11 is a block diagram of an apparatus for sending a configuration resource according to an embodiment of the present disclosure.

FIG. 11 is a block diagram of a signal sending apparatus according to an embodiment of the present disclosure. As shown in FIG. 11, the apparatus includes a first determination module 1102 and a first sending module 1104. The apparatus is described in detail below.

The first determination module 1102 is configured to determine a first configuration resource and a second configuration resource, where a sending mode of a signal sent by using the first configuration resource includes a sending mode of time-domain code division multiplexing. The first sending module 1104 is connected to the first determination module 1102, and is configured to send signals by using the first configuration resource and the second configuration resource, where a resource intersection of the first configuration resource and the second configuration resource in time domain is an empty set.

In one embodiment, the signal described above includes at least one of: an uplink demodulation reference signal, a downlink demodulation reference signal, a channel state information-reference signal or an uplink control channel.

In one embodiment, a phase tracking reference signal is configured through one of the following signaling: higher-layer signaling, or physical layer dynamic signaling and the higher-layer signaling.

In one embodiment, a time-domain density of the phase tracking reference signal is greater than N, where N is a positive number.

Figure 12:
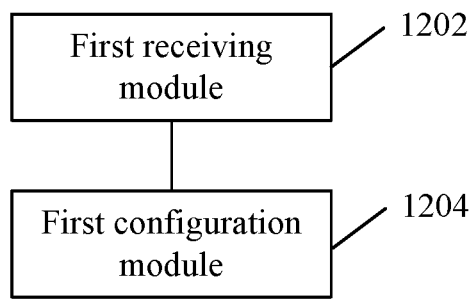
FIG. 12 is block diagram one of an apparatus for configuring a configuration resource according to an embodiment of the present disclosure.

FIG. 12 is block diagram one of a signal receiving apparatus according to an embodiment of the present disclosure. As shown in FIG. 12, the apparatus includes a first receiving module 1202 and a first configuration module 1204. The apparatus is described in detail below.

The first receiving module 1202 is configured to receive a first configuration resource and a second configuration resource, where a receiving mode of a signal sent by using the first configuration resource includes a receiving mode of time-domain code division multiplexing, and a signal sent by using the second configuration resource includes a phase tracking reference signal. The first configuration module 1204 is connected to the first receiving module 1202, and is configured to receive signals sent by using the first configuration resource and the second configuration resource, where a resource intersection of the first configuration resource and the second configuration resource in time domain is an empty set.

In one embodiment, when the first configuration resource and the second configuration resource overlap in the time domain, configuring the first configuration resource includes: changing the receiving mode in the time domain of the signal on the first configuration resource from the code division multiplexing to another mode other than the code division multiplexing.

In one embodiment, the first configuration module 1204 is configured to configure the first configuration resource in the following manner: when the signal on the first configuration resource and the signal on the second configuration resource overlap in the time domain, increasing a processing delay for demodulating the signal sent by using the first configuration resource.

In one embodiment, the first configuration module 1204 is configured to configure the first configuration resource in the following manner: when the first configuration resource and the second configuration resource overlap in the time domain, the phase tracking reference signal being quasi-co-located (QCL) with the signal on the first configuration resource.

In one embodiment, the signal includes at least one of: an uplink demodulation reference signal, a downlink demodulation reference signal, a channel state information-reference signal or an uplink control channel.

In one embodiment, the phase tracking reference signal is determined through one of the following signaling: higher-layer signaling, or physical layer dynamic signaling and the higher-layer signaling.

In some embodiments, a time-domain density of the phase tracking reference signal is greater than N, where N is a positive number.

Figure 13:
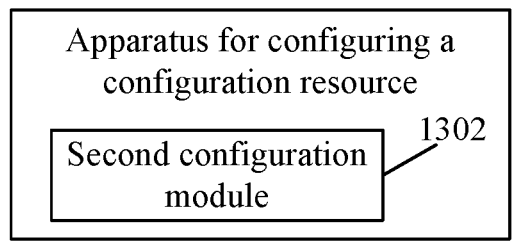
FIG. 13 is block diagram two of an apparatus for configuring a configuration resource according to an embodiment of the present disclosure.

In some embodiments, at least two of orthogonal codes used in the code division multiplexing of the first configuration resource are used. FIG. 13 is block diagram two of an apparatus for configuring a configuration resource according to an embodiment of the present disclosure. As shown in FIG. 13, the apparatus includes a second configuration module 1302. The apparatus is described in detail below.

The second configuration module 1302 is configured to establish an association relationship between a predetermined relationship and information about the configuration resource. The predetermined relationship includes a relationship between a demodulation reference signal and data corresponding to the demodulation reference signal. The predetermined relationship includes at least one of: whether a multiplexing mode of the demodulation reference signal and the corresponding data includes frequency division multiplexing, or a power parameter ratio of the demodulation reference signal to the corresponding data. The information about the configuration resource includes at least one of: the number of time-domain symbols included in a sending unit, the number of time-domain symbols of the demodulation reference signal included in the sending unit, the number of time-domain symbols included in a schedule resource allocated to a receiving end in the sending unit and, or a time-domain spacing of the demodulation reference signal included in the sending unit. Configuration information is information for describing the configuration resource, for example, information indicating the configuration resource or information for configuring the configuration resource.

In one embodiment, when the number of time-domain symbols included in the sending unit or the number of time-domain symbols included in the scheduled resource allocated to the receiving end in the sending unit is greater than X1, the multiplexing mode of the demodulation reference signal and the corresponding data does not include the frequency division multiplexing, where X1 is an integer.

In one embodiment, when the number of time-domain symbols included in the sending unit or the number of time-domain symbols included in the scheduled resource allocated to the receiving end in the sending unit is greater than X1, the power parameter ratio of the demodulation reference signal to the corresponding data is greater than Y, where both X1 and Y are integers.

In one embodiment, when the number of time-domain symbols of the demodulation reference signal included in the sending unit is less than X2, the multiplexing mode of the demodulation reference signal and the corresponding data does not include the FDM, where X2 is an integer.

In one embodiment, when the number of time-domain symbols of the demodulation reference signal included in the sending unit is less than X2, the power parameter ratio of the demodulation reference signal to the corresponding data is greater than Y, where both X2 and Y are integers.

In one embodiment, when the time-domain spacing of the demodulation reference signal in the receiving unit is less than Z, the multiplexing mode of the demodulation reference signal and the corresponding data does not include the frequency division multiplexing, where Z is an integer.

In some embodiments, when the number of time-domain symbols included in the sending unit or the number of time-domain symbols included in the scheduled resource allocated to the receiving end in the sending unit is less than or equal to X1, the power parameter ratio of the demodulation reference signal to the corresponding data is less than or equal to Y.

In one embodiment, when the time-domain spacing of the demodulation reference signal in the sending unit is less than Z, the power parameter ratio of the demodulation reference signal to the corresponding data is greater than Y, where both Z and Y are integers.

Figure 14:
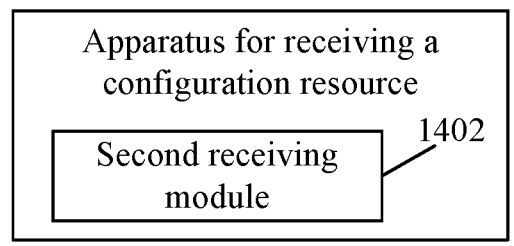
FIG. 14 is a block diagram of an apparatus for receiving a configuration resource according to an embodiment of the present disclosure.

FIG. 14 is a block diagram of an apparatus for receiving a configuration resource according to an embodiment of the present disclosure. As shown in FIG. 14, the apparatus includes a second receiving module 1402. The apparatus is described in detail below.

The second receiving module 1402 is configured to receive an association relationship, configured by a sending end, between a predetermined relationship and information about the configuration resource. The predetermined relationship includes a relationship between a demodulation reference signal and data corresponding to the demodulation reference signal. The predetermined relationship includes at least one of: whether a multiplexing mode of the demodulation reference signal and the corresponding data includes frequency division multiplexing (FDM), or a power parameter ratio of the demodulation reference signal to the corresponding data. The information about the configuration resources includes at least one of: the number of time-domain symbols included in a receiving unit of a receiving end, the number of time-domain symbols of the demodulation reference signal included in the receiving unit of the receiving end, the number of time-domain symbols included in a scheduled resource in the receiving unit of the receiving end, or a time-domain spacing of the demodulation reference signal included in the receiving unit of the receiving end.

In one embodiment, when the number of time-domain symbols included in the receiving unit of the receiving end or the number of time-domain symbols included in the scheduled resource in the receiving unit of the receiving end is greater than X1, the multiplexing mode of the demodulation reference signal and the corresponding data does not include the frequency division multiplexing, where X1 is an integer.

In one embodiment, when the number of time-domain symbols included in the receiving unit of the receiving end or the number of time-domain symbols included in the scheduled resource in the receiving unit of the receiving end is greater than X1, the power parameter ratio of the demodulation reference signal to the corresponding data is greater than Y, where both X1 and Y are integers.

In one optional embodiment, when the number of time-domain symbols of the demodulation reference signal included in the receiving unit of the receiving end is less than X2, the multiplexing mode of the demodulation reference signal and the corresponding data does not includes the frequency division multiplexing, where X2 is an integer.

In one embodiment, when the number of time-domain symbols included in a sending unit or the number of time-domain symbols included in the scheduled resource allocated to the receiving end in the sending unit is less than or equal to X1, the power parameter ratio of the demodulation reference signal to the corresponding data is less than or equal to Y.

In one embodiment, when the number of time-domain symbols of the demodulation reference signal included in the receiving unit of the receiving end is less than X2, the power parameter ratio of the demodulation reference signal to the corresponding data is greater than Y; when the number of time-domain symbols of the demodulation reference signal included in the receiving unit of the receiving end is greater than or equal to X2, the power parameter ratio of the demodulation reference signal to the corresponding data is less than or equal to Y; where both X2 and Y are integers.

In one embodiment, when the time-domain spacing of the demodulation reference signal in the receiving unit of the receiving end is less than Z, the multiplexing mode of the demodulation reference signal and the corresponding data does not include the frequency division multiplexing, where Z is an integer.

In one embodiment, when the time-domain spacing of the demodulation reference signal in the receiving unit of the receiving end is less than Z, the power parameter ratio of the demodulation reference signal to the corresponding data is greater than Y, where both Z and Y are integers.

According to another embodiment of the present disclosure, a storage medium is further provided. The storage medium includes a stored program, where when executed, the program implements the method according to any one of the embodiments described above.

According to another embodiment of the present disclosure, a processor is further provided. The processor is configured to execute a program, where when executed, the program implements the method according to any one of the embodiments described above.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

An embodiment of the present disclosure further provides a storage medium. The storage medium includes a stored program, where when executed, the program implements the method according to any one of the embodiments described above.

In this embodiment, the storage medium may be configured to store program codes for executing steps described above.

In this embodiment, the storage medium may include, but is not limited to, a USB flash disk, a read-only memory (ROM), a random access memory (RAM), a mobile hard disk, a magnetic disk, an optical disk or another medium capable of storing program codes.

For specific examples in this embodiment, reference may be made to the examples described in the above-mentioned embodiments and optional implementation modes, and repetition will not be made in this embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like within the principle of the present disclosure should fall within the scope of the present disclosure.

What is claimed is:

1. A method for configuring a configuration resource, comprising:
    establishing an association relationship between a predetermined relationship and information about the configuration resource, wherein the predetermined relationship comprises a relationship between a demodulation reference signal and corresponding data corresponding to the demodulation reference signal;
    receiving, by a user terminal, the association relationship for determining whether a multiplexing mode of the demodulation reference signal and the corresponding data comprises frequency division multiplexing; wherein
    the predetermined relationship comprises at least one of: whether a multiplexing mode of the demodulation reference signal and the corresponding data comprises frequency division multiplexing, or a power parameter ratio of the demodulation reference signal to the corresponding data; and
    the information about the configuration resource comprises at least one of: a number of time-domain symbols comprised in a sending unit, a number of time-domain symbols of the demodulation reference signal comprised in the sending unit, a number of time-domain symbols comprised in a schedule resource allocated to a receiving end in the sending unit, or a time-domain spacing of the demodulation reference signal comprised in the sending unit;
    wherein in condition that the number of time-domain symbols comprised in the sending unit or the number of time-domain symbols comprised in the scheduled resource allocated to the receiving end in the sending unit is greater than X1, the multiplexing mode of the demodulation reference signal and the corresponding data does not comprise the frequency division multiplexing, wherein X1 is an integer.

2. The method of claim 1, wherein in condition that the number of time-domain symbols comprised in the sending unit or the number of time-domain symbols comprised in the scheduled resource allocated to the receiving end in the sending unit is greater than X1, the power parameter ratio of the demodulation reference signal to the corresponding data is greater than Y, wherein both X1 and Y are integers.

3. The method of claim 1, wherein in condition that the number of time-domain symbols comprised in the sending unit or the number of time-domain symbols of the demodulation reference signal comprised in the sending unit is less than or equal to X1, the multiplexing mode of the demodulation reference signal and the corresponding data comprises the frequency division multiplexing.

4. The method of claim 2, wherein in condition that the number of time-domain symbols comprised in the sending unit or the number of time-domain symbols comprised in the scheduled resource allocated to the receiving end in the sending unit is less than or equal to X1, the power parameter ratio of the demodulation reference signal to the corresponding data is less than or equal to Y.

5. An apparatus for configuring a configuration resource, comprising:
    at least one processor; and a storage communicably connected with the at least one processor and configured for storing computer-executable instructions executable by the at least one processor, wherein the computer-executable instructions, when executed by the at least one processor, cause the at least one processor to perform the method for configuring a configuration resource of claim 1.

* * * * *